United States Patent [19]

Kessels

[11] Patent Number: 5,414,651
[45] Date of Patent: May 9, 1995

[54] ARITHMETIC UNIT FOR MULTIPLYING LONG INTEGERS MODULO M AND R.S.A. CONVERTER PROVIDED WITH SUCH MULTIPLICATION DEVICE

[75] Inventor: Jozef L. W. Kessels, Eindhoven, Netherlands

[73] Assignee: U.S. Philips Corporation, New York, N.Y.

[21] Appl. No.: 140,817

[22] Filed: Oct. 21, 1993

Related U.S. Application Data

[63] Continuation of Ser. No. 854,178, Mar. 20, 1992, abandoned.

[30] Foreign Application Priority Data

Mar. 22, 1991 [EP] European Pat. Off. ............ 91200639

[51] Int. Cl.$^6$ ................................................. G06F 7/38
[52] U.S. Cl. ..................................... 364/746; 364/753
[58] Field of Search ......................... 364/746, 753, 754

[56] References Cited

U.S. PATENT DOCUMENTS 4,817,028 3/1989 Masson et al. ...................... 364/753
5,101,431 3/1992 Even ................................. 364/746 X

OTHER PUBLICATIONS

Advances in Cryptology, Crypto '86, Proceedings pp. 277–301; Orton et al "VLSI Implementation of Public Key Encryption Algorithms".

*Primary Examiner*—Long T. Nguyen
*Attorney, Agent, or Firm*—David Schreiber

[57] ABSTRACT

Arithmetic unit for multiplying long integers modulo M and R.S.A. converter provided with such multiplication device.

A systolized and modular arithmetic device has a control module, followed by a series arrangement of processing module, followed by a tail module. For multiplying an integer P and an integer Q modulo a third integer M, a provisional product is incremented each time with Q for a -1- bit in P, preceding by a doubling of the product. For a -0- bit only the doubling ensues. Normalizing mod M is effected by adding the complement of M, W, under control of propagated carry values. A similar procedure is proposed for exponentiation of Q.$^\wedge$ F.

5 Claims, 2 Drawing Sheets

1. 3, 0, 0 true    id, 0, true    id, 0 true    id, 0, true
2.      db→
3. 2, 1, 0, false   db, 0, false
4.      ←0,f      db→
5. 2, 1, 0, f   db, 0, f   db, 0, f
6.      aq→      ←0,f      db→
7. 2, 0, 0, f   aq, 1, f   db, 0, f   db, 0, f
8.      ←0,f      aq→      ←0,f      db→
9. 2, 0, 0, f   aq, 1, f   aq, 0, f   db, 0, f
10.      db→      ←0,f      aq→      ←0,t
11. 1, 0, 0, f   db, 2, f   aq, 0, f   aq, 1, f
12.      ←1,f      db→      ←0,f      aq→
13. 1, 0, 1, f   db, 0, f   db, 0, f   aq, 1, f
14.      aw→      ←0,f      db→      ←0,t
15. 1, 0, 0, f   aw, 0, f   db, 0, f   db, 2, f
16.      ←0,f      aw→      ←1,f      db→
17. 1, 0, 0, f   aw, 0, f   aw, 2, f   db, 0, f
18.      db→      ←1,f      aw→      ←0,t 19. 0, 0, 0, f   db, 2, f   aw, 0, f   aw, 0, f
20.      ←1,f      db→      ←0,f      aw→
21. 0, 0, 1, f   db, 0, f   db, 0, f   aw, 0, f
22.      aw→      ←0,f      db→      ←0,t
23. 0, 0, 0, f   aw, 0, f   db, 0, f   db, 0, f
24.      ←0,f      aw→      ←0,f      db→
25. 0, 0, 0, f   aw, 0, f   aw, 1, f   db, 0, f
26.      id→      ←0,f      aw→      ←0,t
27. 0, 0, 0, f   id, 0, f   aw, 1, f   aw, 0, f
28.      ←0,f      id→      ←0,f      aw→
29. 0, 0, 0, f   id, 0, f   id, 1, f   aw, 0, f
30.      id→      ←0,f      id→      ←0,t
31. 0, 0, 0, f   id, 0, f   id, 1, f   id, 0, t
32.      ←0,f      id→      ←0,t      id→
33. 0, 0, 0, f   id, 0, f   id, 1, t   id, 0, t
34.      id→      ←0,t      ←0,t      ←0,t
35. 0, 0, 0, f   id, 0, t   id, 1, t   id, 0, t
36.      ←0,t      id→      ←0,t      id→
37. 0, 0, 0, t   id, 0, t   id, 1, t   id, 0, t

FIG. 3b

ARITHMETIC UNIT FOR MULTIPLYING LONG INTEGERS MODULO M AND R.S.A. CONVERTER PROVIDED WITH SUCH MULTIPLICATION DEVICE

This is a continuation of application Ser. No. 07/854,178, filed Mar. 20, 1992, now abandoned.

FIELD OF THE INVENTION

The invention relates to an arithmetic unit for multiplying long integers modulo an integer M. Generally, arithmetic units have been in use for standard word lengths, such as 8, 16 or 32 bits, and thus have been optimized for the actual word length. While operating on a word, the result is usually provided in parallel which has necessitated for complex features such as carry ripples, the complexity of such provisions and the response time incurred growing quickly with increasing word length. The present invention supports arithmetic with a clock rate that is independent of the word length.

The design is systolic in that it consists of a serial arrangement of a single control module followed by an array of processing modules, all of which are simultaneously active. Such a device is useful as a converter for the well-known RSA encryption, see R. L. Rivest et al., A Method for obtaining Digital Signatures and Public-Key Cryptosystems, Comm. ACM, Vol. 21 (February 1978), pages 120–126. The RSA encryption is based on the recognition of a triad of integers E, D, M, such that for any integer message $X<M:(X**(E*D))\mod M=X$. Herein, the asterisk conventionally indicates a multiplication, the double asterisk an exponentiation. Both E and D are smaller than M. In a typical field of use, M consists of 512 bits. The algorithm is used in public cryptographic systems, especially, because the encoding key (E, M) and the decoding key (D, M) cannot be practically derived from each other. Raising to a particular power can be done by repeated multiplication with the starting integer X.

The multiplication of non-integer messages is being considered an obvious extension. If N is the number of bits of M, conventionally the complexity of the above power raising is of the order of $O(N^3)$, which leads to a low conversion speed in case of execution on a sequential general purpose machine even if the latter is intrinsically fast.

SUMMARY OF THE INVENTION

Among other things, it is an object of the invention to provide a systolic machine for multiplying two natural numbers P, Q modulo a third natural number M with a machine size of O(N) sufficient to accommodate P, Q, M, and a high throughput speed. Conventional solutions have two problems. First a multiplication phase followed by a separate reduction phase would lead to an intermediate result of size 2*N in between the two phases. By now unconventionally handling the bits of the control operand in the multiplication procedure in order of decreasing significance, the operations in the multiplication procedure and the operations in the reduction procedure can be interleaved so as to keep the intermediate result restricted. The interleaving of both procedures leads to a dynamic control sequence. Therefore an arithmetic unit is needed with control signals to indicate which operation is to be executed. The second problem is that in such an arithmetic unit with large size, both the propagation of games and the broadcasting of the control signals would prevent a high clock rate. Therefore in the systolic solution cames ripple in the direction of increasing significance (carry save technique) while control signals move in the opposite direction.

It is the above way of cross-wise propagation of the necessary ingredients to the calculation (apart from those quantity parts that are locally present) that allows the setup to be described hereinafter to attain a throughput speed of $O(1/N)$. According to one specific aspect of the invention the object is realized by providing a systolized and modular arithmetic device for multiplying a first multibit integer Q with a second multibit integer P modulo a third multibit integer M, said arithmetic unit comprising a control module followed by a series arrangement of processing modules, followed by a tail module, said processing modules having modular storage means for storing mutually exclusive first bit parts of said first integer Q and mutually exclusive second bit parts indicating said third integer M of pairwise equal significance and along said series arrangement of monotonously decreasing significance levels away from said control module, said control module having presentation means for as based on successive bit positions of said second integer P presenting a control bit string for by each control bit so present in a first cycle part of each cycle tippling an elementary multiplication operation in the low significant direction, through said series arrangement, in a second cycle part rippling a carry propagation in the high significant direction, in a third cycle part selectively upon detecting an egression over said third integer rippling a modularizing operation in the low significant direction and in a fourth cycle part rippling a borrow quantity in the high significant direction, four successive cycle parts constituting a complete cycle associated with a particular bit position of said second multibit integer P, and wherein said tail module has emulating means for emulating dummy parts of said first and third integers with respect to the low significant end of said series arrangement.

Although the general set-up works excellent according to this general principle, it has been considered better to translate the modularizing into an addition with the complement of M. In this respect, advantageously, the control module has presentation means for serially presenting a control signal string for forward propagation through said series arrangement, under control of successive bit positions of said second integer according to monotonously decreasing significance levels, to wit a -double- instruction followed by an addQ instruction under control of a -1- bit in P, but only a -double-instruction under control of a zero bit in P, and said series arrangement having backpropagation means for backpropagating a carry signal after each control signal, the control module forward propagates an addW instruction for every carry received which results effectively in a substraction of M. Advantageously, the normalization value W is the complement of said third integer M ($W=2N-M$, where N is the size of M, i.e. $2(N-1)-1<M<2**N$).

Advantageously, each processing module operates on only a single bit significance level. This provides an extremely simple layout of the modules, whereas the granularity allows for using only the number of modules needed. Alternatively, modules could operate on a succession of bit significance levels, such as 2, 4 or 8. Within each module, the operation may be conventional, so that the module operates faster than would be able with the corresponding single-bit-modules. Between successive modules, the inventive procedures and hardware provisions would be presented. This would still allow for enough flexibility in most cases, while still keeping the design of the modules relatively simple.

The invention also relates to a device for exponentiation of an integer X to a power E modulo said third integer M, wherein said series arrangement has control means for loading said integer X as representing said first integer Q and said control module has second control means for activating said presentation means for presenting various powers of said integer X as representing said second integer P, and wherein furthermore recycling means are provided to recycle a preliminary product back to said control module as representing a subsequent value of said second integer P. Exponentiation is a sequence of multiplications, wherein the two factors are built from the original integer X. In an elementary set-up, only the product is recycled and multiplied by X, so that the exponent is raised by one.

For faster operation, however, either the preliminary product is recycled and multiplied with itself, followed by a multiplication by X, or only the multiplication with itself is executed, as based on whether the exponent bit in question is 1 or 0, respectively. The only necessary provision is that the storage capacity per module is sufficient, inasmuch now always the one factor Q, the product actually being formed, and the preliminary product of the preceding multiplication must be stored. For example, for E=11 (binary 1011), the first bit produces X, the second $X.X=X^2$, the third $X^2.X^2.X=X^5$, the fourth $X^5.X^5.X=X^{11}$. Note that the first bit in fact does $X^0.X^0.X=X$ Various advantageous aspects are recited in dependent claims.

BRIEF DESCRIPTION OF THE FIGURES

A preferred embodiment of the invention will be explained in particular with respect to the accompanying Figures and Tables, wherein first the general setup is explained with respect to an embodiment, next an embodiment of the control module, thereafter an embodiment of the processing module.

FIG. 3a shows a block diagram of the exponentiation/multiplication device in accordance with an embodiment of the present invention wherein two three-bit integers are operated on; and FIG. 3b shows a state diagram showing the operation of the exponentiation/multiplication device in accordance with the operation in FIG. 3a.

Tables 1-12 specify various operations and definitions.

DESCRIPTION OF A PREFERRED EMBODIMENT

Figure 1:
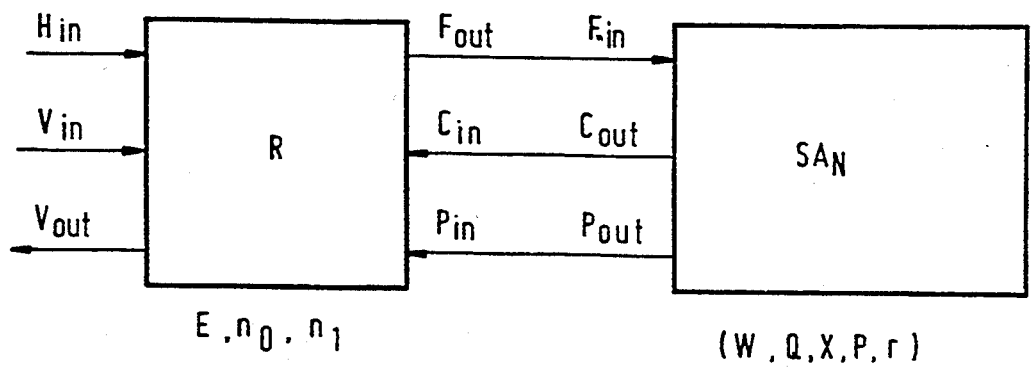
FIG. 1 shows a block diagram of an exponentiation/multiplication device in accordance with the present invention.

FIG. 1 is an elementary block diagram of an exponentiation/multiplication device according to the invention. Herein, the device is conceptually decomposed into a control module R and an array of processing modules symbolized by a block $SA_N$, wherein N is the number of modules. The control module receives from the outer world, such as a higher level host machine, signals $H_{in}$, $V_{in}$ and outputs thereto through $V_{out}$. Towards the array of processing modules the control module outputs signal $F_{out}$ and receives therefrom signals $C_{in}$, $P_{in}$. Likewise, the array of processing modules receives signals $F_{in}$ and outputs signals $C_{out}$, $P_{out}$ back to the control module. Between the processing modules the interface is the same as the one between control module and the string of processing modules.

The setup shown is detailed hereinafter for the exponentialization. Multiplication is a subcomputation of exponentiation. Now, the data available in the control module consists of E, the exponent value that is smaller than M, and two counters n0, n1 in the range [0,N] (where N is the number of bits of M). The array of processing modules must now calculate (X**E) mod M. To this effect the array of processing modules stores the following quantities:

W=2**N-M and X the quantity that is to be raised to exponent E. Moreover the processing modules have means to store the intermediate results P,Q and r. More particularly, Q is an intermediate result of exponentiation, whereas r is an intermediate result of the multiplication of the operands P and Q (where P is either X or Q).

DESCRIPTION OF THE OPERATIONAL PROCESS

Table 1 specifies the types of various quantities figuring in the method. The phase is a binary value. At the first value the key is loaded. At the second value the message block are loaded and converted and finally output. The type bit is standard binary. The type carry is a three-valued carry quantity. The type instruction may have any of eleven values, each named as according to the list thereafter. In particular, to be discussed hereinafter in detail, -store- means transferring from the storage space reserved for quantity r to the storage space reserved for the quantities W,Q,X, and P (storeW, storeQ, storeX, storeP). The instruction may be coded in a conventional way such as a four bit quantity. Non-used values may be designed to control special functions, such as test.

The instruction loadX transfers information from X to r. Next, the channel types are specified. $H_{in}$ is the externally controlled phase, $V_{in}$, $V_{out}$, $P_{in}$ are binary channels, $C_{in}$ is a channel of type carry, and $F_{out}$ for outputting control values of type instruction. The control module receives carries through input port $C_{in}$. In the communication between the control module and the array of processing modules the communications through the instruction channel $F_{out}$ and the carry channel $C_{in}$ alternate. This section, only considers the operation of the control module on a functional level. On a hardware level, mapping of those functions on elements of a programmed microprocessor would be conventional. Alternatively, a translation to dedicated special purpose hardware would be obvious to the skilled art technician. Generally, several modules could be realized on an integrated circuit. Alternatively, the whole device could be computer-assisted-designed into a single integrated circuit.

Now, for the control module in particular, Table 2 gives the variable declaration and the principal execution loop by the control module. There is declared a variable h of type -phase-, two carry values car and c of type carry, two count values of type (0..N), a bit value b and an array E of N bits containing the exponent.

The infinite loop waits for the phase control signal which it receives through channel $H_{in}$ in variable h. If the phase value "loadkey" (actually a binary value) is received, the conversion key is loaded. The key, in particular consists of quantities E, W, to wit, the exponent and the complemented modulo value M. First the exponent is loaded in the bit array E, then the value W is loaded in the distributed variable r (r is distributed over the processing modules). Subsequently this value is stored in distributed variable W by forwarding the instruction storeW to the array of processing modules. The storeW instruction is followed by a carry communication from the processing modules to the control module.

On the other hand, if the received phase indicates "convert" the message block X is loaded in variable r and subsequently stored in X by forwarding the instruction storeX and waiting for the carry value. Subsequently, the procedure X_exp_E_mod_M is called, which yields a value that is smaller than 2N. Since the result must be smaller than M, the normalize operation is executed which yields an equivalent value (modulo M) smaller than M. Finally the result is output. The exponentiation and normalization effectively are done by the series of processing modules to be detailed hereinafter. Inasmuch as h may have only two different values always one of the phases prevails.

In the control module, via $V_{in}$, $V_{out}$ and $P_{in}$ always bit-serially blocks of N bits are communicated while starting with the most significant bit. Table 3 gives the realizations of the two operations load_exponent and load_r. In load_exponent, count n0 is initialized to N. Thereafter, the system loops in that for each bit position, the bit on signal $V_{in}$ is awaited and stored in an array E. In operation loadr, the variable r is first initialized to zero by issuing the instruction set0 and thereupon, the carry c is awaited on $C_{in}$. Next, the count n0 is set to N. Thereafter the control module executes a loop in which for each bit position, first, the bit on port $V_{in}$ is received and the count decremented. Next, the value of r is doubled by issuing the instruction mul2 and awaiting carry c from $C_{in}$. If the bit received through $V_{in}$ is equal to zero the iteration step is ready. If the received bit is equal to 1, the value of r is incremented by one by issuing the instruction add1 and once more receiving a carry from $C_{in}$. After N such steps r has the value received through port $V_{in}$.

The procedure used to compute (XE) mod M is based on the algorithm shown in Table 6. The exponentiation maintains the invariant (Q2**n) * X(E mod 2n)=X**E. First Q is set to 1 and n is set to N. Now, the most significant zero bits in the exponent are skipped. Thereafter, as long as n is positive, the following loop is executed. First, n is decremented and Q is squared. Next, if the current bit in the exponent equals 1, Q is multiplied by X; otherwise Q is not modified.

Likewise, Table 7 gives the algorithm for multiplication, i.e. for computing (P*Q). The computation maintains invariant (P mod 2**n)*Q+r*(2**n)=P*Q. In this case variable r is set to zero; and variable n is set to N. Now, as long as n is positive, first, n is decremented and r is doubled. Next, depending on which of the two guards is true, either no operation is effected, or Q is added to r.

Table 4 shows the procedure X_exp_E_mod_M as executed by the control module. The distributed variable Q is set to 1 by issuing three instructions. First, the instruction set0 is output and carry c awaited, this makes r equal to zero. Next, instruction add1 is outputted and carry c awaited. Thereafter, instruction storeQ is outputted and the carry awaited. The combination of these three operations sets variable Q to 1. Next counter n0 is initialized to N. Thereafter the most significant zero bits in the exponent are skipped. The remaining bits of the exponent are handled by executing a loop in which each step starts in a state in which the variables r and Q contain the same value. In each step first the procedure mul_Q_mod_M is executed, which operation is specified hereinafter. This procedure, in particular, assigns to both r and Q the value r * Q mod M. Therefore, since r was equal to Q at the beginning of the procedure execution, the procedure has squared Q modulo M. Next, for zero value of the exponent bit pointed to by n0, the iteration step is completed. For a one value of the exponent bit in question, first, the variable r is set to X by issuing the instruction loadX and subsequently receiving a carry. Subsequently the procedure mul_Q_mod_M is executed, which results in the computation of Q*X modulo M.

Table 5 specifies the procedure mul_Q_mod_M. In the power raising, P is an auxiliary variable for the multiplication. First, the value in r is stored in variable P by issuing the instruction storeP and subsequently receiving a carry. Next, the instruction set0 is output and the carry c is awaited. Now, the quantities car and b are made zero, and count n1 is set equal to N. It should be noted that n0 sequences along the bits of the exponent value, whereas n1 sequences along the bits of multiplication factor P. Next, a loop is executed as long as either the car value, or b or n1 is positive (car>0 or b=1 or n1>0). In each loop step one out of three commands is executed. If the car value is positive (car>0), the value of car is decreased by one and an addW instruction is issued. Both operations together effectuate a subtraction by M, since a carry represents the value 2N and M=2N-W. If the car value is zero and b equals one (car=0 and b=1), b is set to zero and the addQ instruction is output. If both car and b are zero (car=0 and b=0), n1 is positive (follows from loop condition) and therefore the next bit of factor P can be received and count n1 decremented by one. Next, the mul2 instruction is output. After issuing one of the three instructions, the carry c is awaited and added to the value of car. In this way all bits of factor P are treated in succession. At the end of the loop r is equivalent to P*Q modulo M, but it is not necessarily smaller than 2N. Therefore, a new loop is entered in which all possible carries in the processing modules are propagated towards the control module. First count n1 is again set to N. The loop continues as long as the value of either car or n1 is positive. If car is positive, car is decremented, count n1 is set to N, and instruction addW is output. If car is equal to zero (which implies that n1 is positive), count n1 is decremented and the ident instruction is output. The instruction ident does not modify the value of r, it only serves to propagate carries. After issuing one of the two commands, carry c is awaited and added to the value car. After the loop the value of r is smaller than 2N. The value of r is then stored in Q by issuing the storeQ instruction and receiving a carry.

After the exponentiation the value of r is normalized. Table 8 details the normalizing operation, which assigns to variable r the value r mod M. Initially, r is smaller than 2**N and after normalization r is even smaller than M. Initially the value of r is also present in Q. First the value of W is added to r by issuing the addW instruction and subsequently propagating all carries. If a carry is received, the original r was larger than M and the updated value is r-M. If on the other hand, no carry is received, the old value of r, still being present in Q, was correct and should be output. So, the operation starts with sending the instruction addW and awaiting a carry. Count n1 is set to N. Now, as long as c=0 and n1 is non-zero, the ident instruction is output, the counter n1 is decreased, and a carry value received. Upon leaving the loop one of the following conditions holds. If no carry is received (c=0), the value of Q is restored in r by first issuing the instruction set0 and receiving a carry value and subsequently issuing the instruction addQ and receiving a carry value. If on the other hand, the carry is equal to one, the updated value of r is correct and is left unmodified. Finally, the result is output as indicated in Table 9. First, the value of r is stored in the shift register by issuing the storeP instruction and awaiting a carry value. Next, count n0 is set equal to N. In the next following loop, as long as n0>0, a bit is received from $P_{in}$ and subsequently output through $V_{out}$, after which n0 is decremented.

Figure 2:
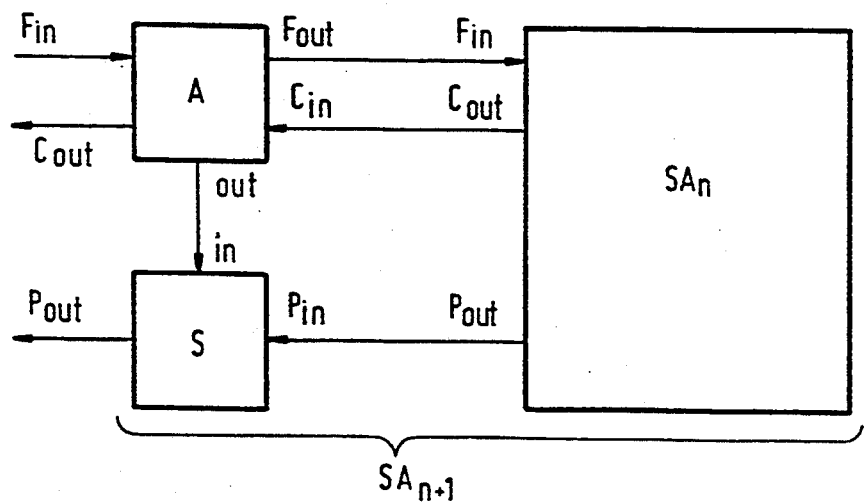
FIG. 2 shows a block diagram of a processing module in accordance with the present invention.

FIG. 2 more specifically shows the systolic design of SAn. The design is recursive in that module SAn+1 consists of an arithmetic cell A, a shift register cell S, and a similar but smaller module SAn. If n is positive, module SAn again consists of a pair of A/S cells and a module SAn-1. Finally there is a tail cell SA0, which does not effectively execute any arithmetic.

Table 10 exemplifies the function of tail cell SA0. It continuously loops while receiving instruction f, and depending on the nature of this instruction, outputs either a 1 or a 0 on its carry output $C_{out}$. SA0 never communicates through port $P_{out}$. Table 11, likewise, shows the functions of shift register cell S. It continuously loops and in each loop step it first waits for a bit either through port in from the corresponding arithmetic cell (load operation) or through port $P_{in}$ from its right-hand neighbour (shift operation). The bit received is subsequently output to its left neighbour through port $P_{out}$. In fact, the cell is a one bit shift register with a multiplexed input. Note that at any time at most one of the two input ports offers a bit.

Likewise, Table 12 shows the functions of arithmetic cell A. It has a variable c of type carry, a variable carry with a value range 0..4; a variable f of the type instruction, and three bits w, q, x. Now, first the cell awaits an instruction from input $F_{in}$; at reception, variables car, c are reset to zero. Next, a loop is executed where the the instruction value determines which operation is executed. For the eleven instructions listed earlier the following operations are performed: set0 sets car to zero, add1 retains the value of car, mu12 multiplies car by two, ident retains the value of car, addW adds w to car, addQ adds q to car, loadX assigns to car the value of x, storeW assigns to w the least significant bit of car (car mod 2), storeQ assigns to q the value (car mod 2), storeX assigns to x the value (car mod 2), storeP outputs the value (car mod 2) through output port out. Next, the instruction f is output through output port $F_{out}$; and the two most significant bits of car are output through Cout. Then, the next instruction is received via Fin and a carry value via $C_{in}$. The carry value received is added to the least significant bit of car and then the next loop step is executed.

The systolic design is extreme in that each processing module contains one bit of the values P, Q and W. Such a solution is fast, but make great demands on area and power consumption, since such a bit-slice architecture requires the maximum number of cells to construct the multiplier. If such a high speed is not required, a slower but cheaper design can be obtained by increasing the slice size.

Figure 3A:
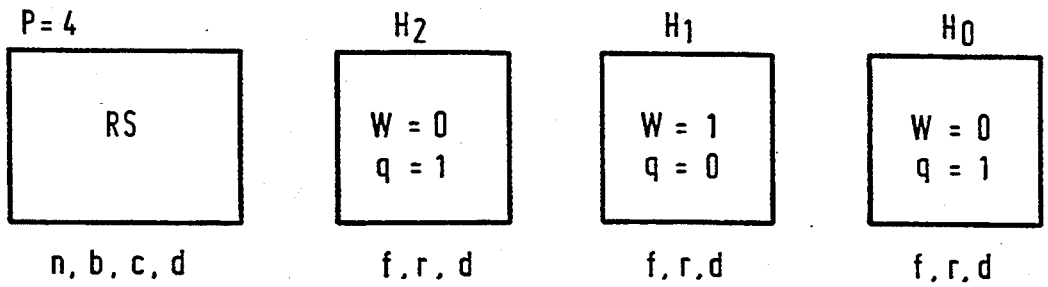

For completeness' sake, FIGS. 3a, 3b give a complete example of multiplying a threebit integers P=4(100) by Q=5(101) modulo M, represented by W=2 (010). Control module RS, processing modules H2, H1, H0 have been shown, together with the quantities they contain. In FIG. 3b, the first column shows 37 states, which each correspond either to the operation in a cycle part (indicated by arrows), together with the quantifies transferred, or by the situation after such transfer and the operation ensued. In consequence, a sequence of 8 lines corresponds to one cycle. The quantity n is the number of bits awaiting processing, true and false have been abbreviated as t, f, respectively, d is the binary produced by the tail module emulating a dummy quantity, id (ident), aw (addw), aq (addq), db (double) are self explanatory. On line 37 the control module finds that d=true, indicating the end. Given the bit length of the two multiplicands, this could come no later than line 37, so it may as well be determined by counting. Dependent on the various quantities W, P, Q, the end could also come earlier, so the embodiment shown is somewhat faster, under particular circumstances.

I claim:

1. A systolized and modular arithmetic device for multiplying a first multibit integer Q and a second multibit integer P modulo a third multibit integer M, said integers are input to said device during a first cycle and processed during a second cycle, comprising:

a control module;

a first processing module coupled to said control module;

a second processing module coupled to said first processing module;

a tail module coupled to said second processing module;

said first and second processing modules having modular storage means for storing mutually exclusive first bit parts of said first integer Q and mutually exclusive second bit parts indicating said third integer M in monotonously decreasing significance away from said control module;

said control module having output means for outputting a control signal to said first processing module and input means for receiving a carry signal from said first processing module;

said first processing module having means for receiving said control signal from said control module and for receiving a carry signal from said second module, output means for outputting said carry signal to said control module and outputting said control signal to said second processing module and multiplying means for multiplying a portion of said first multibit integer Q and a portion of said second multibit integer P modulo M;

said second processing module having means for receiving said control signal from said first processing module and for receiving a carry signal from said tail module, output means for outputting said carry signal to said first processing module and outputting said control signal to said tail module and multiplying means for multiplying a further portion of said first multibit integer Q and a further portion of said second multibit integer P modulo M;

said means for receiving and output means of said second processing module operating one half cycle later than said means for receiving and output means of first processing module; and said tail module including emulating means for emulating a dummy signal of said first integer Q and said third integer M with respect to a low significant end and outputting said dummy signal to said second processing module.

2. The device of claim 1, wherein each processing module operates on one bit of said multibit integers.

3. The device of claim 2, wherein said first and second processing modules each include a detection means for detecting a dummy signal received in said carry signal after outputting all bits of said second integer.

4. The device of claim 3, wherein said control module includes counting means for counting said cycles after outputting all bits of said second integer.

5. The device of claim 1, wherein said control module loads a fourth integer X in place of said first integer Q and said fourth integer X raised to a power less than E in place of said second integer P and wherein said control module includes recycling means to recycle a product PxQ to be loaded as said second integer P during a next cycle.

* * * * *